(12) United States Patent
Wang et al.

(10) Patent No.: US 11,749,013 B2
(45) Date of Patent: Sep. 5, 2023

(54) OPTICAL FINGERPRINT RECOGNITION CIRCUIT

(71) Applicant: HUAWEI TECHNOLOGIES CO., LTD., Shenzhen (CN)

(72) Inventors: Xilin Wang, Dongguan (CN); Honghai Zhang, Hangzhou (CN); Lilin Xia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 17/182,540

(22) Filed: Feb. 23, 2021

(65) Prior Publication Data

US 2021/0174051 A1    Jun. 10, 2021

Related U.S. Application Data

(63) Continuation of application No. PCT/CN2019/102265, filed on Aug. 23, 2019.

(30) Foreign Application Priority Data

Aug. 24, 2018  (CN) .......................... 201810972261.8
Jan. 4, 2019   (CN) .......................... 201910008178.3

(51) Int. Cl.
    *G06V 40/13*   (2022.01)
(52) U.S. Cl.
    CPC ................................ *G06V 40/1318* (2022.01)
(58) Field of Classification Search
    None
    See application file for complete search history.

(56) References Cited

U.S. PATENT DOCUMENTS

| 6,043,525 A | 3/2000 | Chen |
| 8,199,235 B2* | 6/2012 | Okita ..................... H04N 5/374 |
| | | 348/301 |
| 8,284,280 B2* | 10/2012 | Barbier ............... H04N 5/3745 |
| | | 348/308 |
| 10,158,813 B2* | 12/2018 | Nishihara ........... H04N 5/3559 |
| 2004/0228508 A1 | 11/2004 | Shigeta |

(Continued)

FOREIGN PATENT DOCUMENTS

| CN | 1193174 A | 9/1998 |
| CN | 1922470 A | 2/2007 |

(Continued)

OTHER PUBLICATIONS

Extended European Search Report issued in European Application No. 19852428.2, dated Sep. 14, 2021, pp. 1-6, European Patent Office, Munich, Germany.

(Continued)

*Primary Examiner* — Benjamin X Casarez
(74) *Attorney, Agent, or Firm* — Hauptman Ham, LLP

(57) ABSTRACT

This application provides an optical signal processing circuit and an electronic device, to improve a signal-to-noise ratio of an output signal of a fingerprint sensor, thereby improving a fingerprint recognition rate. The optical signal processing circuit includes a photosensitive device, an amplifier transistor $T_1$, a switch transistor $T_2$, a switch transistor $T_3$, a readout circuit, a control circuit, and a voltage-adjustable power supply. When the optical signal processing circuit is in a compensation reset phase, the voltage of the gate of $T_1$ exactly reaches a level at which the amplifier transistor $T_1$ is turned on. Therefore, when an input voltage and a voltage increment are applied to the gate of $T_1$, a gate-source voltage Vgs of $T_1$ increases, and $T_1$ amplifies an input voltage signal to generate an output signal.

20 Claims, 5 Drawing Sheets

(56) References Cited

U.S. PATENT DOCUMENTS

| | | | | |
|---|---|---|---|---|
| 2005/0007353 | A1* | 1/2005 | Smith | G09G 3/3233 |
| | | | | 345/204 |
| 2005/0077911 | A1* | 4/2005 | Miyasaka | G06V 40/1306 |
| | | | | 324/662 |
| 2005/0099372 | A1* | 5/2005 | Nakamura | G06F 3/0412 |
| | | | | 345/79 |
| 2006/0232580 | A1* | 10/2006 | Koyama | H04N 5/3741 |
| | | | | 348/E3.021 |
| 2015/0002414 | A1* | 1/2015 | Tan | G06F 3/0412 |
| | | | | 345/173 |
| 2016/0178768 | A1 | 6/2016 | Tredwell | |
| 2018/0032780 | A1 | 2/2018 | Li et al. | |
| 2018/0189538 | A1* | 7/2018 | He | G06V 40/1306 |
| 2018/0225547 | A1* | 8/2018 | Kim | G06V 10/758 |
| 2019/0043420 | A1* | 2/2019 | Jung | G09G 3/3225 |
| 2019/0171860 | A1* | 6/2019 | Wu | G06F 3/0418 |

FOREIGN PATENT DOCUMENTS

| | | |
|---|---|---|
| CN | 203134328 U | 8/2013 |
| CN | 104778925 A | 7/2015 |
| CN | 103219047 B | 9/2015 |
| CN | 105304023 A | 2/2016 |
| CN | 105893992 A | 8/2016 |
| CN | 106156741 A | 11/2016 |
| CN | 106981503 A | 7/2017 |
| CN | 107578026 A | 1/2018 |
| CN | 107958243 A | 4/2018 |
| CN | 108307180 A | 7/2018 |

OTHER PUBLICATIONS

International Search Report issued in corresponding International Application No. PCT/CN2019/102265, dated Nov. 29, 2019.

Zhang Xiaolei et al.,"The Development of Image Acquisition System For Finger Vein",Feb. 2008,total:80pages.

H. Morimura et al.,"A novel sensor cell architecture and sensing circuit scheme for capacitive fingerprint sensors",May 2000,total:8pages.

Chinese Office Action issued in corresponding Chinese Application No. 201910008178.3, dated Feb. 27, 2023, pp. 1-6.

\* cited by examiner

OPTICAL FINGERPRINT RECOGNITION CIRCUIT

CROSS-REFERENCE TO RELATED APPLICATIONS

This application is a continuation of International Application No. PCT/CN2019/102265, filed on Aug. 23, 2019, which claims priority to Chinese Patent Application No. 201810972261.8, filed on Aug. 24, 2018 and Chinese Patent Application No. 201910008178.3, filed on Jan. 4, 2019. The disclosures of the aforementioned applications are hereby incorporated by reference in their entireties.

TECHNICAL FIELD

This application relates to the field of circuits, and more specifically, to an optical signal processing circuit and an optical fingerprint recognition system.

BACKGROUND

Under-screen optical fingerprint recognition is becoming a standard configuration of a current mobile phone product. A user can enable a fingerprint recognition function by pressing a finger on a position on a screen. Specifically, light is generated by using a light source under the screen to illuminate a finger, and reflected light of the finger carries fingerprint information and is received by an image sensor under the screen, to generate a fingerprint image. Then a fingerprint feature is extracted, and may be used to implement functions such as unlocking and payment, thereby improving security performance of a mobile phone.

In a fingerprint recognition solution in the prior art, a large-area optical fingerprint sensor on a thin film transistor (TFT) substrate may be used to acquire and detect fingerprint reflected light that passes through a screen. In the optical fingerprint sensor, each pixel read circuit for reading fingerprint reflected light includes only one TFT transistor (which may be referred to as a 1T circuit), and the TFT transistor is used as a gating switch during fingerprint signal reading. When a fingerprint reflected light signal is weak, a signal-to-noise ratio of an output signal of the fingerprint sensor is relatively low, and a relatively high fingerprint recognition rate cannot be implemented.

Therefore, there is an urgent need to improve the signal-to-noise ratio of the output signal of the fingerprint sensor when the fingerprint reflected optical signal is weak, to improve the fingerprint recognition rate.

SUMMARY

This application provides an optical signal processing circuit and an electronic device, to resolve a prior-art problem of a low fingerprint recognition rate.

According to a first aspect, an optical signal processing circuit is provided, including a photosensitive device, an amplifier transistor $T_1$, a switch transistor $T_2$, a switch transistor $T_3$, a readout circuit, a control circuit, and a voltage-adjustable power supply, where the photosensitive device is connected to a gate of the amplifier transistor $T_1$, the switch transistor $T_2$ is bridged between the gate and a drain of the amplifier transistor $T_1$, a source of the amplifier transistor $T_1$ is connected to the voltage-adjustable power supply, the source or the drain of the amplifier transistor $T_1$ is connected to the readout circuit by using the switch transistor $T_3$, and the control circuit is connected to the switch transistor $T_2$, the switch transistor $T_3$, and the voltage-adjustable power supply;

the control circuit is configured to control the optical signal processing circuit to be in a first state, where when the optical signal processing circuit is in the first state, the photosensitive device is not exposed; and when the control circuit is configured to control the optical signal processing circuit to be in the first state, the control circuit is specifically configured to: control the switch transistor $T_2$ to be turned on, control the voltage-adjustable power supply to generate a compensation reset voltage, and control the switch transistor $T_3$ to be turned off, so that a gate-source voltage Vgs of the amplifier transistor $T_1$ is equal to a threshold voltage $V_T$ of the $T_1$;

the control circuit is further configured to control the optical signal processing circuit to be in a second state, where the second state is a state after the first state, and when the optical signal processing circuit is in the second state, the photosensitive device is exposed and generates an input voltage applied to the gate of the amplifier transistor $T_1$; and when the control circuit is configured to control the optical signal processing circuit to be in the second state, the control circuit is specifically configured to: control the switch transistor $T_2$ to be turned off, control the voltage-adjustable power supply to be disconnected from the source of the amplifier transistor $T_1$, and control the switch transistor $T_3$ to be turned off; and the control circuit is further configured to control the optical signal processing circuit to be in a third state, where the third state is a state after the second state, and when the optical signal processing circuit is in the third state, the photosensitive device stops exposure; and when the control circuit is configured to control the optical signal processing circuit to be in the third state, the control circuit is specifically configured to: control the switch transistor $T_2$ to be turned off, and control the switch transistor $T_3$ to be turned on, so that the readout circuit obtains an output signal of the amplifier transistor $T_1$, and the control circuit is further specifically configured to control the voltage-adjustable power supply to generate a read reference voltage, so that Vgs of the amplifier transistor $T_1$ is a sum of $V_T$, the input voltage, and a voltage increment, where the voltage increment is an amplitude difference between the compensation reset voltage and the read reference voltage, and the voltage increment is greater than 0 V.

In this embodiment of this application, when the optical signal processing circuit is in a compensation reset phase, a voltage of the gate of $T_1$ exactly reaches a level at which the amplifier transistor $T_1$ is turned on. Therefore, when the input voltage and the voltage increment are applied to the gate of $T_1$, the gate-source voltage Vgs of $T_1$ increases, and $T_1$ amplifies an input voltage signal to generate an output signal.

In addition, in this embodiment of this application, the source of the amplifier transistor $T_1$ is connected to an adjustable voltage, so that the adjustable voltage is the compensation reset voltage in a compensation phase of $T_1$, and the adjustable voltage is the read reference voltage in a fingerprint signal reading phase, so that when the gate of $T_1$ reads a fingerprint signal, an increment of the gate-source voltage Vgs is a sum of an input voltage corresponding to the fingerprint signal and the voltage increment. In this embodiment of this application, the voltage increment can further increase the gate-source voltage Vgs of $T_1$, thereby increasing a static operating point of an amplification circuit, and further amplifying an input fingerprint signal. Therefore, in this embodiment of this application, a gain of the amplifier transistor $T_1$ can be controlled, a signal-to-noise ratio of an output signal of a fingerprint sensor can be improved, and a fingerprint recognition rate can be improved.

Optionally, in this embodiment of this application, the voltage-adjustable power supply may include a selection circuit, a first power supply, and a second power supply. The first power supply is configured to generate the compensation reset voltage, and the second power supply is configured to generate the read reference voltage.

The selection circuit may be configured to perform a selection in which the first power supply is connected to the source of the amplifier transistor $T_1$, and the second power supply is not connected to the source of the amplifier transistor $T_1$. Alternatively, the selection circuit may perform a selection in which the second power supply is connected to the source of the amplifier transistor $T_1$, and the first power supply is not connected to the source of the amplifier transistor $T_1$. Alternatively, the selection circuit may perform a selection in which neither the first power supply nor the second power supply is connected to the source of the amplifier transistor $T_1$. This solution is an implementation, is easy to implement, and reduces design costs.

Optionally, in this embodiment of this application, the voltage-adjustable power supply may include a voltage control circuit and an adjustable power supply, and the adjustable power supply may generate a voltage with an adjustable value. The voltage control circuit may adjust, under control of the control circuit, the value of the voltage generated by the adjustable power supply, so that the voltage changes to the compensation reset voltage or the read reference voltage, or the adjustable power supply is disconnected from the source of the amplifier transistor $T_1$, that is, the voltage-adjustable power supply provides no voltage for the amplifier transistor $T_1$. This solution is an implementation, is easy to implement, and reduces design costs.

Optionally, in this embodiment of this application, when the readout circuit is based on an integrator circuit, the obtained output signal is an output current. As a readout circuit, the integrator circuit belongs to a relatively mature technology. Therefore, an implementation based on this is simple, reducing design costs.

With reference to the first aspect, in some implementations of the first aspect, the amplifier transistor $T_1$ is an N-type thin film transistor TFT, and the gate of the amplifier transistor $T_1$ is connected to an anode of the photosensitive device.

With reference to the first aspect, in some implementations of the first aspect, the drain of the amplifier transistor $T_1$ is connected to the readout circuit by using the switch transistor $T_3$;

the voltage-adjustable power supply includes a switch transistor $T_4$, a switch transistor $T_5$, a first power supply, and a second power supply, where the switch transistor $T_4$ is connected to the first power supply, the switch transistor $T_5$ is connected to the second power supply, the first power supply is configured to generate the compensation reset voltage, and the second power supply is configured to generate the read reference voltage; and when the control circuit controls the switch transistor $T_4$ to be turned on and the switch transistor $T_5$ to be turned off, the first power supply is connected to the source of the amplifier transistor $T_1$;

when the control circuit controls the switch transistor $T_4$ to be turned off and the switch transistor $T_5$ to be turned on, the second power supply is connected to the source of the amplifier transistor $T_1$; and when the control circuit controls the switch transistor $T_4$ to be turned off and the switch transistor $T_5$ to be turned off, neither the first power supply nor the second power supply is connected to the source of the amplifier transistor $T_1$.

With reference to the first aspect, in some implementations of the first aspect, the switch transistor $T_2$, the switch transistor $T_3$, the switch transistor $T_4$, and the switch transistor $T_5$ are all N-type TFTs. This solution may be implemented by using an existing TFT process, and is easy to implement, thereby reducing design costs.

With reference to the first aspect, in some implementations of the first aspect, the compensation reset voltage is −4.5 V, and the read reference voltage is −6 V. The two types of voltages are voltages that are easy to obtain. Therefore, an implementation is simple, and design costs are reduced.

With reference to the first aspect, in some implementations of the first aspect, the amplifier transistor $T_1$ is a P-type TFT, and the gate of the amplifier transistor $T_1$ is connected to a cathode of the photosensitive device.

With reference to the first aspect, in some implementations of the first aspect, the drain of the amplifier transistor $T_1$ is connected to a bias power supply by using a switch transistor $T_6$, and an anode of the photosensitive device is connected to the bias power supply, where the bias power supply is configured to generate a bias voltage;

the voltage-adjustable power supply includes a switch transistor $T_7$, the switch transistor $T_3$, a first power supply, and a second power supply, where the switch transistor $T_7$ is connected to the first power supply, the source of the amplifier transistor $T_1$ is connected to the readout circuit by using the switch transistor $T_3$, the readout circuit includes an operational amplifier circuit, a non-inverting input terminal of the operational amplifier circuit is connected to the second power supply, the first power supply is configured to generate the compensation reset voltage, and the second power supply is configured to generate the read reference voltage;

when the control circuit controls the switch transistor $T_7$ to be turned on and the switch transistor $T_3$ to be turned off, the first power supply is connected to the source of the amplifier transistor $T_1$;

when the control circuit controls the switch transistor $T_7$ to be turned off and the switch transistor $T_3$ to be turned on, the second power supply is connected to the source of the amplifier transistor $T_1$; and when the control circuit controls the switch transistor $T_7$ to be turned off and the switch transistor $T_3$ to be turned off, neither the first power supply nor the second power supply is connected to the source of the amplifier transistor $T_1$.

With reference to the first aspect, in some implementations of the first aspect, the switch transistor $T_2$, the switch transistor $T_3$, the switch transistor $T_6$, and the switch transistor $T_7$ are all P-type TFTs.

With reference to the first aspect, in some implementations of the first aspect, the compensation reset voltage is −1 V, and the read reference voltage is −0.6 V.

Optionally, the photosensitive device is a photo diode or an organic photodetector.

According to a second aspect, an optical signal processing system is provided, including at least two rows of optical signal processing circuits according to any one of the first aspect and the possible implementations of the first aspect, where each of the at least two rows includes at least one optical signal processing circuit, and the at least two rows of optical signal processing circuits share a control circuit; and the shared control circuit is configured to input a same control signal into an optical signal processing circuit in a first row of the at least two rows and an optical signal processing circuit in a second row of the at least two rows, where the control signal is used to control the optical signal processing circuit in the first row to be in the first state, and the optical signal processing circuit in the second row to be in the third state.

Therefore, in this embodiment of this application, when a fingerprint signal of a current row is read, compensation reset can be performed on an optical processing circuit that has completed reading in a previous row, to prepare to start exposure of a next frame. In this way, a read operation and a compensation reset operation are completed in one scanning process.

According to a third aspect, an electronic device is provided, including the optical signal processing system according to the second aspect, a panel, a display screen module, and a processor, or another module or unit, where the optical signal processing system is disposed on the panel, the display screen module is configured to provide illumination for the optical signal processing circuit, and the processor is configured to process an output signal output by the optical signal processing system.

DESCRIPTION OF EMBODIMENTS

The following describes technical solutions of this application with reference to the accompanying drawings.

Figure 1:
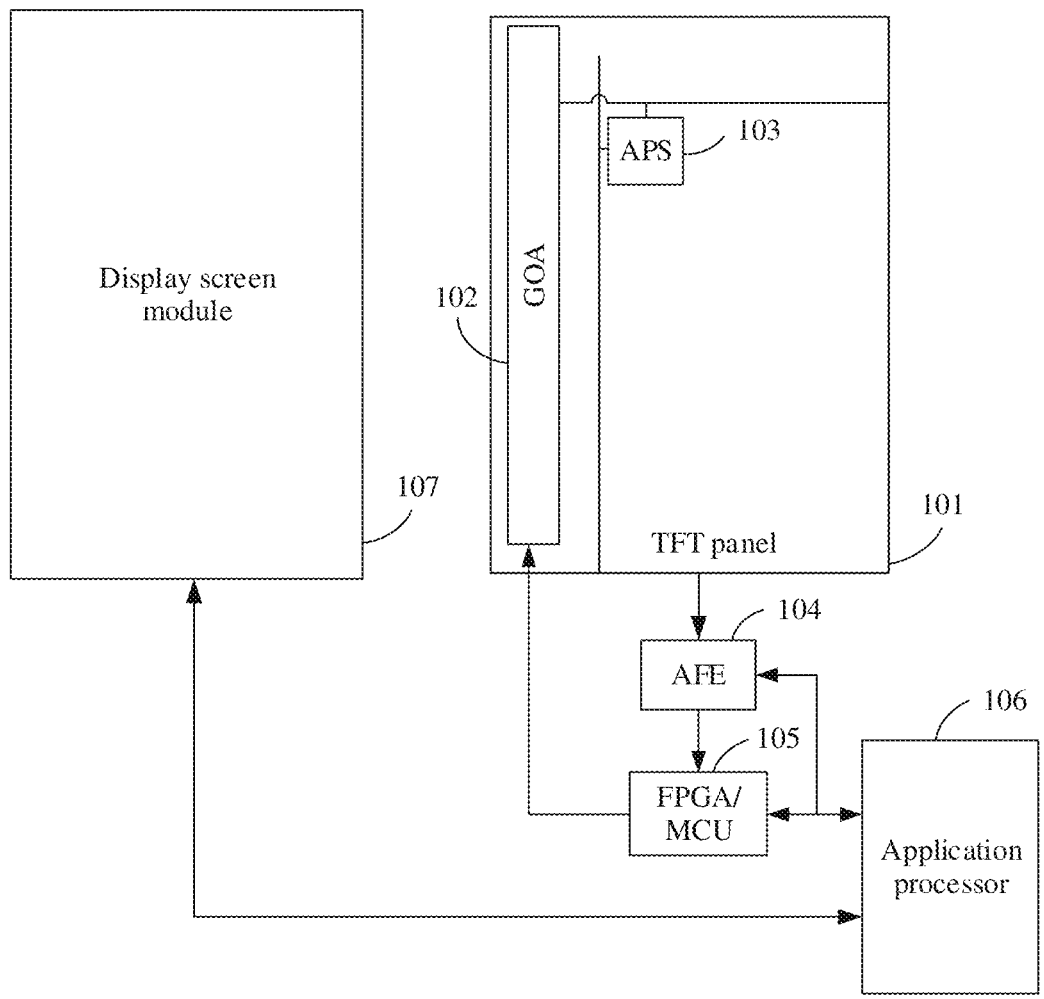
FIG. 1 is a framework diagram of a fingerprint acquisition system according to an embodiment of this application.

FIG. 1 is a framework diagram of a fingerprint acquisition system according to an embodiment of this application. The fingerprint acquisition system in this embodiment of this application may be used for under-screen fingerprint detection of a terminal device such as a mobile phone or a tablet computer. The fingerprint acquisition system includes a TFT panel 101, a gate driver on array (gate driver on array, GOA) 102, an active pixel sensor (active pixel sensor, APS) 103, an analog front end (analog front end, AFE) 104, a field programmable gate array (field programmable gate array)/microcontroller (microcontroller unit) 105, an application processor (application processor) 106, and a display screen module 107.

The TFT panel 101 is a panel on which a fingerprint sensor is located, and a side of the TFT panel 101 is the GOA 102, configured to sequentially select a line. The fingerprint sensor includes a pixel sensor array, and the pixel sensor array includes an APS 103 corresponding to each pixel. The AFE 104 is configured to: acquire a fingerprint signal detected by the TFT panel 101, where the fingerprint signal is an analog signal, and output a digital signal corresponding to the analog signal. The FPGA/MCU 105 is configured to: control a time sequence of the AFE 104, control the GOA, perform interface conversion on fingerprint data of the AFE 104, and transmit converted fingerprint data to the application processor 106 for feature extraction and comparison processing. The display screen module 107 includes a self-luminous pixel, for example, an organic light-emitting diode (organic light-emitting diode, OLED), and may provide illumination for acquiring a fingerprint.

Figure 2:
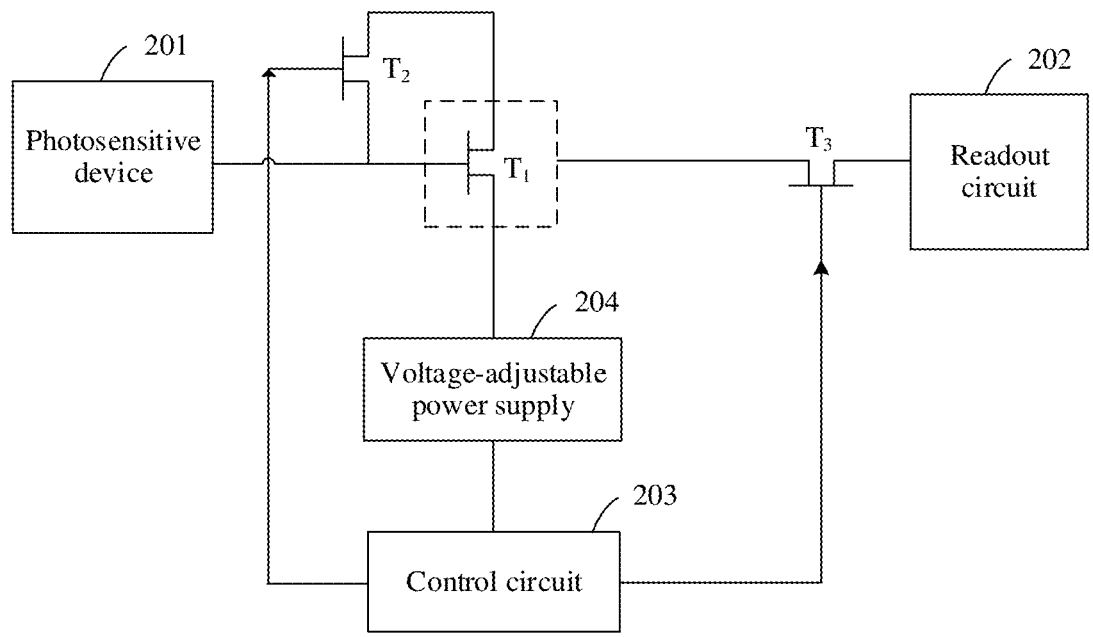
FIG. 2 is a schematic diagram of an optical signal processing circuit according to an embodiment of this application.

FIG. 2 is a schematic diagram of an optical signal processing circuit according to an embodiment of this application. The optical signal processing circuit includes a photosensitive device 201 (for example, a photo diode (photo diode, PD) or an organic photodetector (organic photodetector, OPD)), an amplifier transistor $T_1$, a switch transistor $T_2$, a switch transistor $T_3$, a readout circuit 202, a control circuit 203, and a voltage-adjustable power supply 204. The photosensitive device 201 is connected to a gate of $T_1$, $T_2$ is bridged between the gate and a drain of $T_1$, a source of $T_1$ is connected to the voltage-adjustable power supply 204, the source or the drain of $T_1$ is connected to the readout circuit 202 by using $T_3$, and the control circuit 203 is connected to $T_2$, $T_3$, and the voltage-adjustable power supply. Herein, $T_1$ is configured to amplify an input fingerprint signal. Herein, that $T_2$ is bridged between the gate and the drain of $T_1$ means that an input terminal and an output terminal of $T_2$ are respectively connected to the gate and the drain of $T_1$, a control terminal of $T_2$ is connected to the control circuit 203, and $T_2$ is turned on or turned off under control of the control circuit.

Specifically, the control circuit 203 is, for example, the GOA 102 in FIG. 1, and can generate a compensation reset control signal and a read control signal. An example in which the compensation reset control signal is a first scan signal (scan 1) and the read control signal is a second scan signal (scan 1) is used below for description. However, this does not constitute a limitation on this embodiment of this application.

In this embodiment of this application, a control signal output by the control circuit 203 may control the optical signal processing circuit to be in a compensation reset phase, an exposure phase, and a reading phase. Specifically, the optical signal processing circuit may perform the foregoing work process under control of scan 1 and scan 2, to read the fingerprint signal. It should be understood that the three phases in the work process may further have other command manners. For example, the compensation reset phase, the exposure phase, and the reading phase may be sequentially referred to as a first state, a second state, a third state, and the like. This is not limited in this embodiment of this application.

Specifically, the control circuit is configured to control the optical signal processing circuit to be in the compensation reset phase. When the optical signal processing circuit is in the compensation reset phase, the photosensitive device is not exposed. When the control circuit is configured to control the optical signal processing circuit to be in the compensation reset phase, the control circuit is specifically configured to: control the switch transistor $T_2$ to be turned on, control the voltage-adjustable power supply to generate a compensation reset voltage, and control the switch transistor $T_3$ to be turned off, so that a gate-source voltage Vgs of the amplifier transistor $T_1$ is equal to a threshold voltage $V_T$ of the $T_1$.

The control circuit is further configured to control the optical signal processing circuit to be in the exposure phase, where the exposure phase is a phase after the compensation reset phase. When the optical signal processing circuit is in the exposure phase, the photosensitive device is exposed and generates an input voltage applied to the gate of the amplifier transistor $T_1$. When the control circuit is configured to control the optical signal processing circuit to be in the exposure phase, the control circuit is specifically configured to: control the switch transistor $T_2$ to be turned off, control the voltage-adjustable power supply to be disconnected from the source of the amplifier transistor $T_1$, and control the switch transistor $T_3$ to be turned off. "Disconnected" herein means that the voltage-adjustable power supply provides no voltage for the amplifier transistor $T_1$.

The control circuit is further configured to control the optical signal processing circuit to be in the reading phase, where the reading phase is a phase after the exposure phase. When the optical signal processing circuit is in the reading phase, the photosensitive device stops exposure. When the control circuit is configured to control the optical signal processing circuit to be in the exposure phase, the control circuit is specifically configured to: control the switch transistor $T_2$ to be turned off, control the switch transistor $T_3$ to be turned on, and control the voltage-adjustable power supply to generate a read reference voltage, so that Vgs of the amplifier transistor $T_1$ is a sum of $V_T$, the input voltage, and a voltage increment, where the voltage increment is an amplitude difference between the compensation reset voltage and the read reference voltage, so that the readout circuit obtains an output signal of the amplifier transistor $T_1$.

Optionally, in this embodiment of this application, when the readout circuit is based on an integrator circuit, the obtained output signal is an output current.

For example, the control circuit 203 generates scan 1 and scan 2. In the compensation reset phase, scan 1 controls $T_2$ to be turned on, scan 2 controls $T_3$ to be turned off, and scan 1 and/or scan 2 controls the voltage-adjustable power supply to generate a compensation reset voltage ($V_{DD}$). Because the gate and the drain of $T_1$ are short-circuited, the gate-source voltage Vgs decreases. When the gate-source voltage Vgs decreases to be equal to the threshold voltage $V_T$ of $T_1$, $T_1$ is in a cut-off state, and the gate-source voltage Vgs stops decreasing, so that the gate-source voltage Vgs of $T_1$ remains at the threshold voltage $V_T$ of $T_1$. That is, in this phase, threshold compensation of the amplifier transistor $T_1$ is completed, so that a voltage of the gate of the $T_1$ exactly reaches a level at which the amplifier transistor $T_1$ is turned on.

After the voltage of the gate of $T_1$ reaches the level at which the amplifier transistor $T_1$ is turned on, the optical signal processing circuit is in the exposure phase. In the exposure phase, scan 1 controls $T_2$ to be turned off, scan 2 controls $T_3$ to be turned off, and scan 1 and/or scan 2 controls the source of $T_1$ to be disconnected from the adjustable voltage. That is, after the voltage of the gate of $T_1$ reaches the level at which the amplifier transistor $T_1$ is turned on, the photosensitive device 201 is exposed. In this case, the photosensitive device obtains a fingerprint optical signal. Then, the photosensitive device performs optical-to-electrical conversion on the optical signal to generate a charge, so that a voltage at a position in which the photosensitive device 201 is connected to the gate of the amplifier transistor $T_1$ changes. That is, the photosensitive device generates an input voltage after exposure, and the input voltage is applied to the gate of $T_1$.

After the exposure of the photosensitive device 201 ends, the optical signal processing circuit enters the reading phase. Specifically, scan 1 controls $T_2$ to be turned off, and scan 2 controls $T_3$ to be turned on, so that the readout circuit 202 reads the fingerprint signal (that is, an output current of $T_1$). In addition, scan 1 and/or scan 2 control the voltage-adjustable power supply to generate a read reference voltage. In this case, Vgs of the $T_1$ is a sum of $V_T$, the input voltage, and a voltage increment. The voltage increment is used to make Vgs larger, so that an output signal is also larger. In addition, depending on whether a positive level or a negative level is used for Vgs, a positive level or a negative level may also be correspondingly used for the voltage increase. The voltage increment is specifically an amplitude difference between the compensation reset voltage and the read reference voltage. The voltage increment is introduced, so that the readout circuit can obtain a larger signal output by the amplifier transistor $T_1$.

When the optical signal processing circuit is in the compensation reset phase, the voltage of the gate of $T_1$ exactly reaches the level at which the amplifier transistor $T_1$ is turned on. Therefore, when the input voltage and the voltage increment are applied to the gate of $T_1$, the gate-source voltage Vgs of $T_1$ increases, and $T_1$ amplifies an input voltage signal to generate an output signal.

In addition, in this embodiment of this application, the source of the amplifier transistor $T_1$ is connected to the adjustable voltage, so that the adjustable voltage is the compensation reset voltage in a compensation phase of $T_1$, and the adjustable voltage is the read reference voltage in a fingerprint signal reading phase, so that when the gate of $T_1$ reads a fingerprint signal, an increment of the gate-source voltage Vgs is a sum of an input voltage corresponding to the fingerprint signal and the voltage increment. In this embodiment of this application, the voltage increment can further increase the gate-source voltage Vgs of $T_1$, thereby increasing a static operating point of an amplification circuit, and further amplifying an input fingerprint signal. Therefore, in this embodiment of this application, a gain of the amplifier transistor $T_1$ can be controlled, a signal-to-noise ratio of an output signal of a fingerprint sensor can be improved, and a fingerprint recognition rate can be improved.

It should be noted that, in this embodiment of this application, a value range of the voltage increment is greater than 0 V, so that Vgs is greater than a sum of $V_T$ and an input voltage generated due to exposure of the photosensitive device when the optical signal processing circuit is in the reading phase. In other words, in this embodiment of this application, the gain of $T_1$ is controlled by controlling a voltage difference between the compensation reset voltage and the read reference voltage.

Optionally, in this embodiment of this application, the voltage-adjustable power supply may include a selection circuit, a first power supply, and a second power supply. The first power supply is configured to generate the compensation reset voltage, and the second power supply is configured to generate the read reference voltage.

The selection circuit may be configured to perform a selection in which the first power supply is connected to the source of the amplifier transistor $T_1$, and the second power supply is not connected to the source of the amplifier transistor $T_1$. Alternatively, the selection circuit may perform a selection in which the second power supply is connected to the source of the amplifier transistor $T_1$, and the first power supply is not connected to the source of the amplifier transistor $T_1$. Alternatively, the selection circuit may perform a selection in which neither the first power supply nor the second power supply is connected to the source of the amplifier transistor $T_1$.

Herein, the selection circuit may also be referred to as a switching circuit, or may have another name. This is not limited in this embodiment of this application.

Optionally, in this embodiment of this application, the voltage-adjustable power supply may include a voltage control circuit and an adjustable power supply, and the adjustable power supply may generate a voltage with an adjustable value. The voltage control circuit may adjust, under control of the control circuit, the value of the voltage generated by the adjustable power supply, so that the value of the voltage changes to the compensation reset voltage or the read reference voltage as required, or the adjustable power supply is disconnected from the source of the amplifier transistor $T_1$ as required.

In an optional embodiment, $T_1$ is an N-type TFT, and the gate of $T_1$ is connected to an anode of the photosensitive device 201.

Optionally, the drain of the amplifier transistor $T_1$ is connected to the readout circuit by using the switch transistor $T_3$. The voltage-adjustable power supply includes a switch transistor $T_4$, a switch transistor $T_5$, a first power supply, and a second power supply. The switch transistor $T_4$ is connected to the first power supply. The switch transistor $T_5$ is connected to the second power supply. The first power supply is configured to generate the compensation reset voltage. The second power supply is configured to generate the read reference voltage.

When the control circuit controls the switch transistor $T_4$ to be turned on and the switch transistor $T_5$ to be turned off, the first power supply is connected to the source of the amplifier transistor $T_1$. When the control circuit controls the switch transistor $T_4$ to be turned off and the switch transistor $T_5$ to be turned on, the second power supply is connected to the source of the amplifier transistor $T_1$. When the control circuit controls the switch transistor $T_4$ to be turned off and the switch transistor $T_5$ to be turned off, neither the first power supply nor the second power supply is connected to the source of the amplifier transistor $T_1$.

Figure 3:
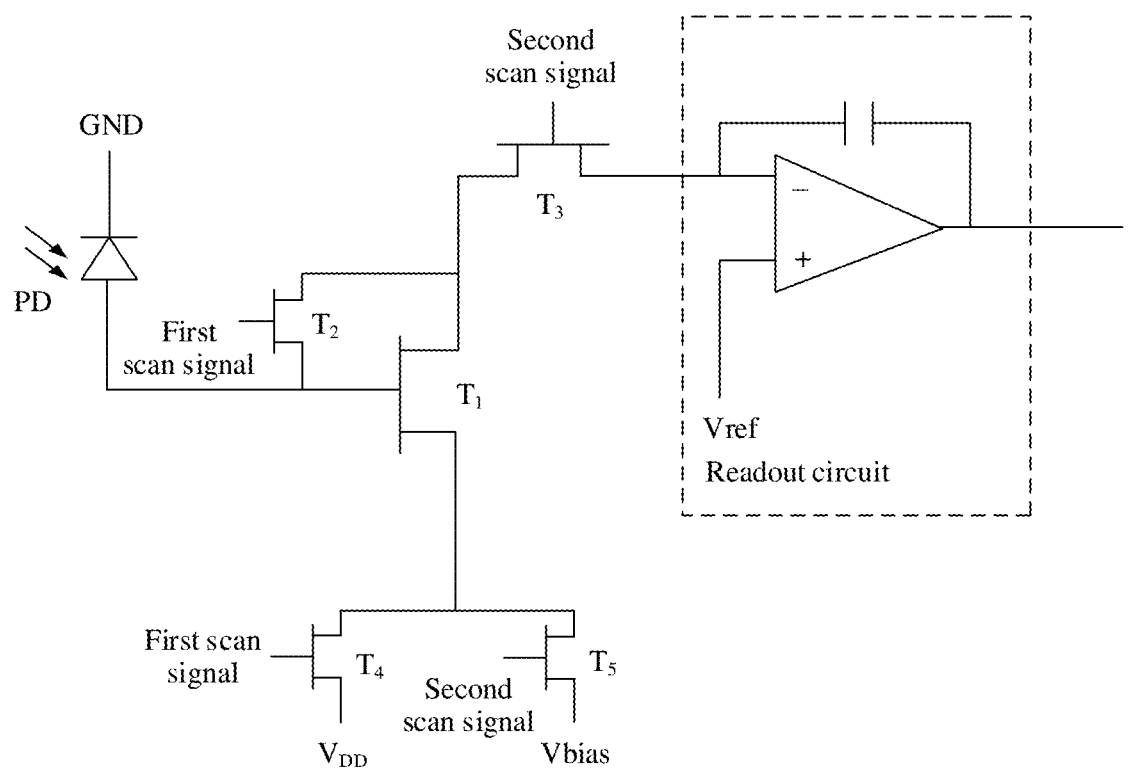
FIG. 3 is a schematic diagram of an optical signal processing circuit according to an embodiment of this application.

FIG. 3 is a schematic diagram of an optional optical signal processing circuit according to an embodiment of this application. In FIG. 3, for example, a photosensitive device is a PD. $T_1$ is an N-type TFT, an anode of the PD is connected to a gate of $T_1$, a cathode of the PD is grounded (GND), a drain of $T_1$ is connected to a readout circuit by using $T_3$, a source of $T_1$ is connected to a compensation reset voltage $V_{DD}$ by using a switch transistor $T_4$, and the source of $T_1$ is also connected to a read reference voltage by using a switch transistor $T_5$. As shown in FIG. 3, in this embodiment of this application, the read reference voltage is a bias voltage Vbias. It should be noted that FIG. 3 shows only an example of a value of each voltage, and does not show a power supply used to generate each voltage. However, this does not constitute a limitation on this embodiment of this application.

In this embodiment of this application, when $T_4$ is controlled to be turned on and $T_5$ is controlled to be turned off, the source of $T_1$ is connected to an adjustable voltage, and the adjustable voltage is equal to the compensation reset voltage $V_{DD}$. When $T_4$ is controlled to be turned off and $T_5$ is controlled to be turned on, the source of $T_1$ is connected to an adjustable voltage, and the adjustable voltage is equal to the read reference voltage Vbias.

Optionally, in this embodiment of this application, $T_1$, $T_2$, $T_3$, $T_4$, and $T_5$ are all N-type TFTs. In this case, scan 1 is input into gates of $T_2$ and $T_4$, and scan 2 is input into gates of $T_3$ and $T_5$. When scan 1 is at a high level and scan 2 is at a low level, $T_2$ and $T_4$ are turned on, and $T_3$ and $T_5$ are turned off. When both scan 1 and scan 2 are at a low level, $T_2$, $T_3$, $T_4$, and $T_5$ are all turned off. When scan 1 is at a low level and scan 2 is at a high level, $T_2$ and $T_4$ are turned off, and $T_3$ and $T_5$ are turned on.

For example, in this embodiment of this application, the compensation reset voltage $V_{DD}$ may be set to −4.5 V, and the read reference voltage Vbias may be set to −6 V. It may be understood that in this embodiment of this application, the compensation reset voltage $V_{DD}$ and the read reference voltage Vbias may be alternatively set to other voltage values, so that $T_1$ amplifies an input fingerprint signal (that is, an input voltage). This is not specifically limited in this embodiment of this application.

Figure 4:
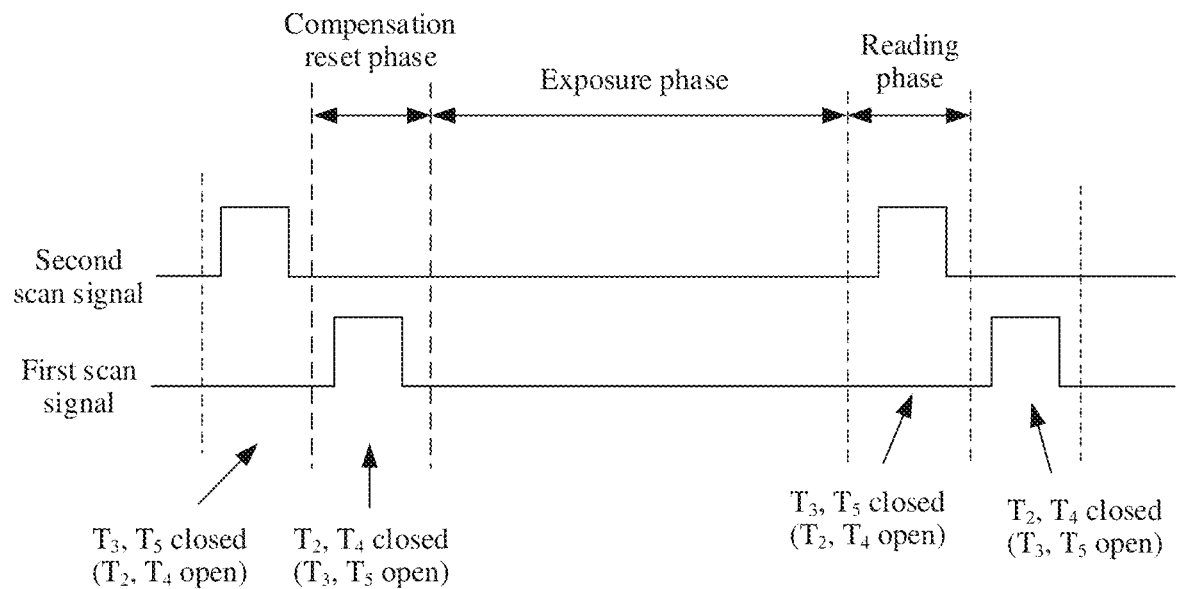
FIG. 4 is a schematic diagram of scan 1 and scan 2 during operation of an optical signal processing circuit according to an embodiment of this application.

FIG. 4 is a schematic diagram of scan 1 and scan 2 during operation of an optical signal processing circuit according to an embodiment of this application. Specifically, when the optical signal processing circuit reads data in a previous frame, scan 1 is at a low level, and scan 2 is at a high level. In this case, $T_3$ and $T_5$ are closed (that is, turned on), and $T_2$ and $T_4$ are open (that is, turned off). Then, the optical signal processing circuit enters a compensation reset phase, scan 1 changes to a high level, and scan 2 changes to a low level. In this case, $T_2$ and $T_4$ are closed (that is, turned on), and $T_3$ and $T_5$ are open (that is, turned off). Because a gate and a drain of $T_1$ are short-circuited, Vgs decreases to be equal to a threshold voltage $V_T$ of $T_1$. In this case, a positive voltage of a PD remains at $V_{DD}+V_T$. Then, the optical signal processing circuit enters an exposure phase. Both scan 1 and scan 2 are at a low level, $T_2$, $T_3$, $T_4$, and $T_5$ are all turned off, and the positive voltage of the PD increases due to photosensitiveness. When an exposure time ends, that is, the exposure phase ends, and a reading phase starts, scan 1 is at a low level, and scan 2 is at a high level. In this case, $T_3$ and $T_5$ are closed (that is, turned on), and $T_2$ and $T_4$ are open (that is, turned off). In this case, $T_1$ enters an amplification state in a bias case, and a readout circuit may read an amplified signal. In addition, because $T_5$ is turned on, a voltage of a source of $T_1$ changes from $V_{DD}$ during reset to lower Vbias. This is equivalent to increasing an amplitude of an input signal (an increment is $V_{DD}$−Vbias). In other words, in this case, Vgs=$V_T$+($V_{DD}$−Vbias). Therefore, an output amplitude of the amplified signal can be increased, and a signal-to-noise ratio of the signal read by the readout circuit can be increased, thereby improving a fingerprint recognition rate. Then, data of a next frame may be read, that is, scan 1 is at a high level, scan 2 is at a low level, and a compensation reset phase of the next frame starts.

It should be noted that, in this embodiment of this application, that $T_1$ enters an amplification state means that $T_1$ can amplify an input signal. In this case, $T_1$ may be in a variable resistance area or a saturation area. This is not limited in this embodiment of this application.

In another optional embodiment, $T_1$ is a P-type TFT, and the gate of $T_1$ is connected to a cathode of a photosensitive device 201.

Optionally, the drain of the amplifier transistor $T_1$ is connected to a bias power supply by using a switch transistor $T_6$, and an anode of the photosensitive device is connected to the bias power supply. The bias power supply is configured to generate a bias voltage. The voltage-adjustable power supply includes a switch transistor $T_7$, the switch transistor $T_3$, a first power supply, and a second power supply. The switch transistor $T_7$ is connected to the first power supply. The source of the amplifier transistor $T_1$ is connected to the readout circuit by using the switch transistor $T_3$. The readout circuit includes an operational amplifier circuit. A non-inverting input terminal of the operational amplifier circuit is connected to the second power supply. The first power supply is configured to generate the compensation reset voltage. The second power supply is configured to generate the read reference voltage.

When the control circuit controls the switch transistor $T_7$ to be turned on and the switch transistor $T_3$ to be turned off, the first power supply is connected to the source of the amplifier transistor $T_1$. When the control circuit controls the switch transistor $T_7$ to be turned off and the switch transistor $T_3$ to be turned on, the second power supply is connected to the source of the amplifier transistor $T_1$. When the control circuit controls the switch transistor $T_7$ to be turned off and the switch transistor $T_3$ to be turned off, neither the first power supply nor the second power supply is connected to the source of the amplifier transistor $T_1$.

Figure 5:
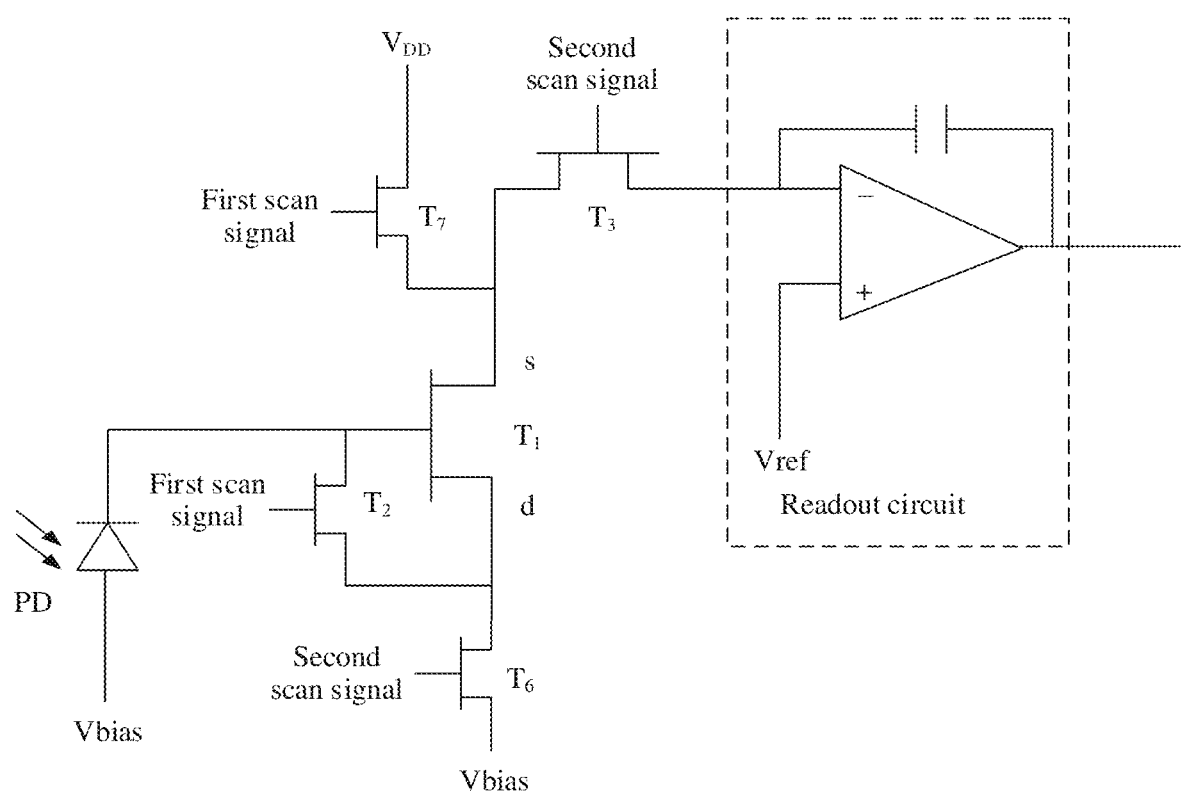
FIG. 5 is a schematic diagram of an optical signal processing circuit according to an embodiment of this application.

FIG. 5 is a schematic diagram of an optional optical signal processing circuit according to an embodiment of this application. In FIG. 5, for example, a photosensitive device is a PD. $T_1$ is a P-type TFTMOS transistor, a cathode of the PD is connected to a gate of $T_1$, an anode of the PD is connected to a bias voltage Vbias, a drain of $T_1$ is connected to the bias voltage Vbias by using a switch transistor $T_6$, a source of $T_1$ is further connected to a compensation reset voltage $V_{DD}$ by using a switch transistor $T_7$, and the source of $T_1$ is connected to a readout circuit by using $T_3$. The readout circuit includes an operational discharge circuit. A non-inverting input terminal of the operational discharge circuit is connected to a read reference voltage. The read reference voltage herein is, for example, Vref. It should be noted that FIG. 5 shows only an example of a value of each voltage, and does not show a power supply used to generate each voltage. However, this does not constitute a limitation on this embodiment of this application.

In this embodiment of this application, when $T_7$ is controlled to be turned on and $T_3$ is controlled to be turned off, the source of the $T_1$ is connected to an adjustable voltage, and the adjustable voltage is equal to the compensation reset voltage $V_{DD}$. When $T_7$ is controlled to be turned off and $T_3$ is controlled to be turned on, the source of $T_1$ is connected to an adjustable voltage, and the adjustable voltage is equal to the read reference voltage Vref.

Optionally, in this embodiment of this application, $T_1$, $T_2$, $T_3$, $T_6$, and $T_7$ are all P-type TFTs. In this case, scan 1 is input into gates of $T_2$ and $T_7$, and scan 2 is input into gates of $T_3$ and $T_6$. When scan 1 is at a high level and scan 2 is at a low level, $T_2$ and $T_7$ are turned on, and $T_3$ and $T_6$ are turned off. When both scan 1 and scan 2 are at a low level, $T_2$, $T_3$, $T_6$, and $T_7$ are all turned off. When scan 1 is at a low level and scan 2 is at a high level, $T_2$ and $T_7$ are turned off, and $T_3$ and $T_6$ are turned on.

For example, in this embodiment of this application, the compensation reset voltage $V_{DD}$ may be set to −1 V, the read reference voltage Vref may be set to −0.6 V, and the bias voltage Vbias may be set to −6 V. It should be noted that, in this embodiment of this application, the compensation reset voltage $V_{DD}$, the read reference voltage Vref, and the bias voltage Vbias may be alternatively set to other voltage values, so that $T_1$ amplifies an input fingerprint signal (that is, an input voltage). This is not specifically limited in this embodiment of this application.

Figure 6:
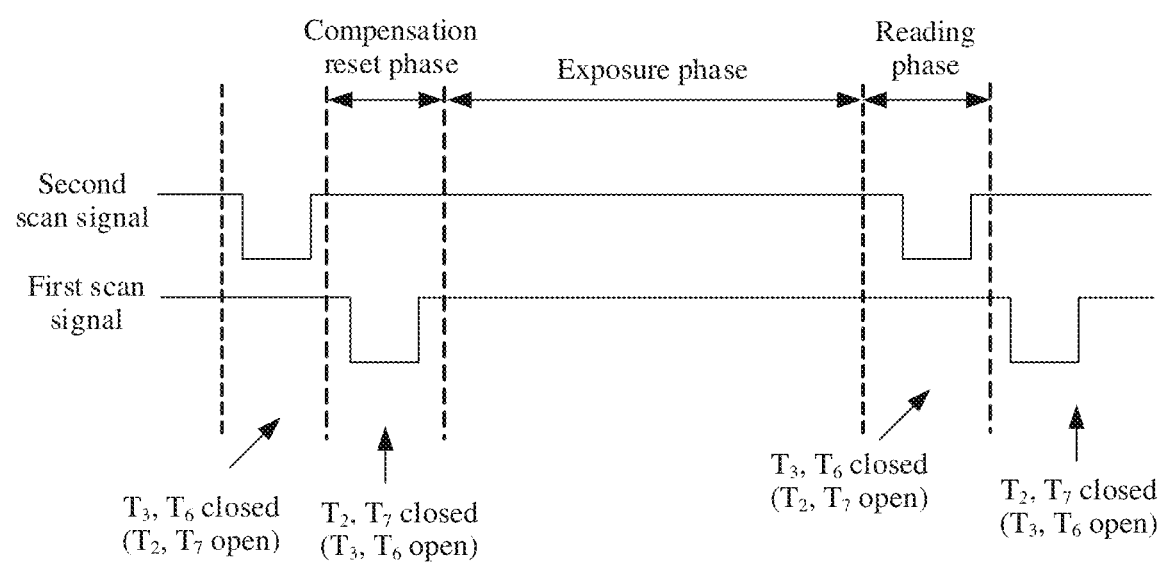
FIG. 6 is a schematic diagram of scan 1 and scan 2 during operation of an optical signal processing circuit according to an embodiment of this application.

FIG. 6 is a schematic diagram of scan 1 and scan 2 during operation of an optical signal processing circuit according to an embodiment of this application. Specifically, when the optical signal processing circuit reads data in a previous frame, scan 1 is at a high level, and scan 2 is at a low level. In this case, $T_3$ and $T_6$ are closed (that is, turned on), and $T_2$ and $T_7$ are open (that is, turned off). Then, the optical signal processing circuit enters a compensation reset phase, scan 1 changes to a low level, and scan 2 changes to a high level. In this case, $T_2$ and $T_7$ are closed (that is, turned on), and $T_3$ and $T_6$ are open (that is, turned off). Because a gate and a drain of $T_1$ are short-circuited, Vgs increases to be equal to a threshold voltage $V_T$ of $T_1$. In this case, a cathode voltage of a PD remains at Vbias+$V_T$. Then, the optical signal processing circuit enters an exposure phase. Both scan 1 and scan 2 are at a high level, $T_2$, $T_3$, $T_6$, and $T_7$ are all turned off, and the cathode voltage of the PD decreases due to photosensitiveness. When an exposure time ends, that is, the exposure phase ends, and a reading phase starts, scan 1 is at a high level, and scan 2 is at a low level. In this case, $T_3$ and $T_6$ are closed (that is, turned on), and $T_2$ and $T_7$ are open (that is, turned off). In this case, $T_1$ enters an amplification state in a bias case, and a readout circuit may read an amplified signal. In addition, because $T_3$ is turned on, a voltage of a source of $T_1$ changes from $V_{DD}$ during reset to higher Vref. This is equivalent to increasing an amplitude of an input signal (an increment is Vref−$V_{DD}$). In other words, in this case, Vgs=$V_T$+(Vbias−$V_{DD}$). Therefore, an output amplitude of the amplified signal can be increased, and a signal-to-noise ratio of the signal read by the readout circuit can be increased, thereby improving a fingerprint recognition rate. Then, data of a next frame may be read, that is, scan 1 is at a low level, scan 2 is at a high level, and a compensation reset phase of the next frame starts.

In the embodiments of this application, the N-type TFT may use an NMOS process, and the P-type TFT may use a PMOS process. Optionally, in the embodiments of this application, the amplifier transistor or the switch transistor may alternatively be another type of transistor. In the embodiments of this application, only the TFT is used as an example for description, but this does not constitute a limitation on the technical solutions in the embodiments of this application.

Optionally, an embodiment of this application further provides an optical signal processing system. The optical signal processing circuit may include at least two rows of optical signal processing circuits in the foregoing embodiment. Each of the at least two rows of optical signal processing circuits include at least one optical signal processing circuit, and the at least two rows of optical signal processing circuits share a control circuit. The shared control circuit is configured to input a same control signal into an optical signal processing circuit in a first row of the at least two rows and an optical signal processing circuit in a second row of the at least two rows. The control signal is used to control the optical signal processing circuit in the first row to be in the compensation reset phase, and the optical signal processing circuit in the second row to be in the reading stage. In other words, a same control signal can simultaneously control one optical signal processing circuit to be in a compensation reset phase, and another optical signal processing circuit to be in a reading phase.

In a possible implementation, a fingerprint sensor, that is, a pixel sensor array, may include at least two rows of optical signal processing circuits, and each row of optical signal processing circuits include at least one of the optical signal processing circuits described above. The control circuit includes at least two gate lines. Each gate line inputs a compensation reset control signal (for example, scan 1) into each row of optical signal processing circuits, and simultaneously inputs a read control signal (for example, scan 2) into a previous row of optical signal processing circuits of the row of optical signal processing circuits. In other words, one gate line is connected to two rows of optical signal processing circuits at the same time. A control signal provided by the gate line may be used as a compensation reset control signal of one line of optical signal processing circuits, and may also be used as a read control signal of the other line of optical signal processing circuits.

Figure 7:
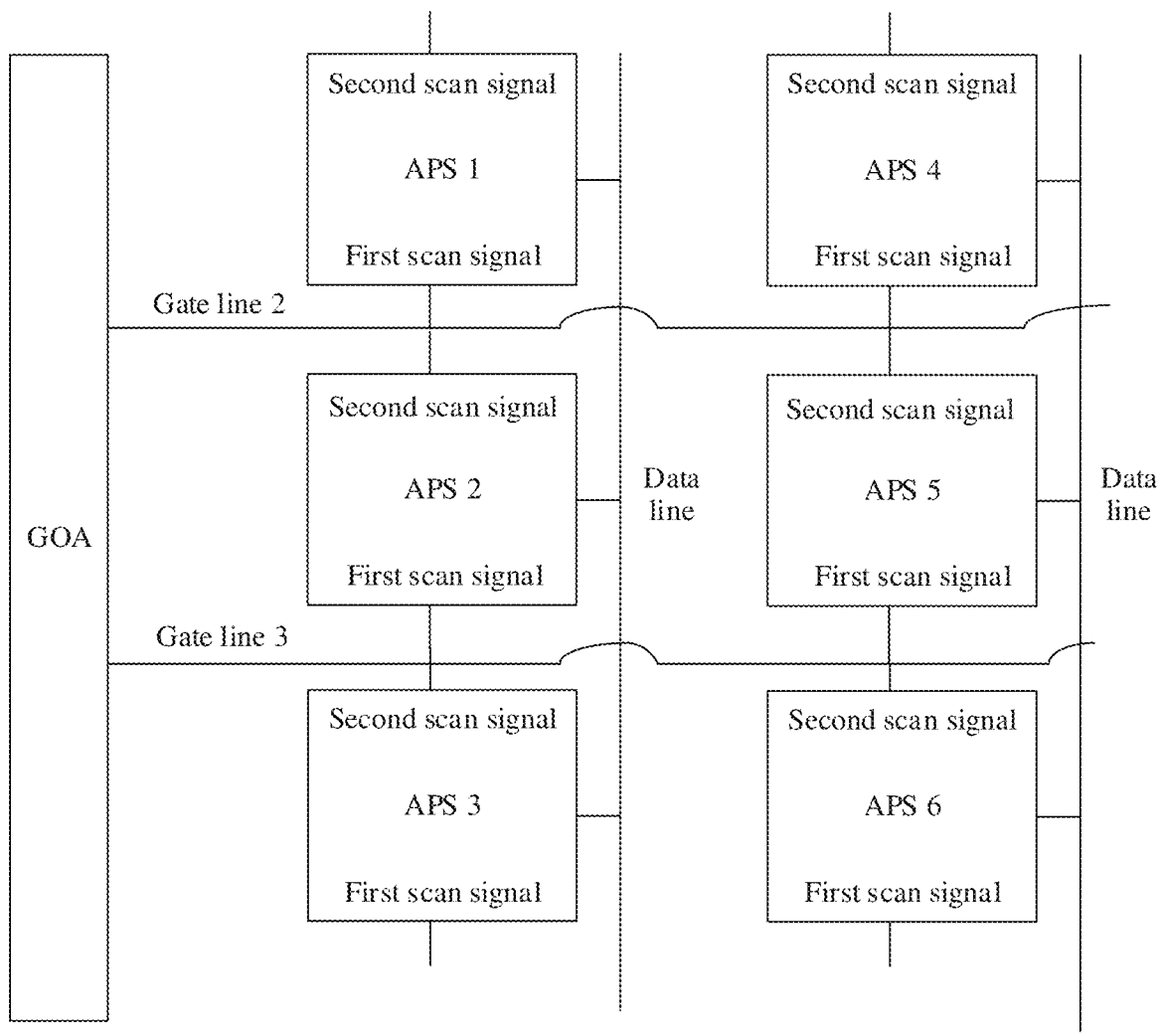
FIG. 7 is a partial schematic diagram of a fingerprint sensor according to an embodiment of this application.

FIG. 7 is a partial schematic diagram of a fingerprint sensor according to an embodiment of this application. The fingerprint sensor includes at least two rows of APSs, and each row of APSs include at least one APS. For example, FIG. 7 shows only three rows of APSs, and each row of APSs include two APSs. Specifically, a first row of APSs include an APS 1 and an APS 4, a second row of APSs include an APS 2 and an APS 5, and a third row of APSs include an APS 3 and an APS 6. Correspondingly, FIG. 7 shows only a gate line (gate line) 2, a gate line 3, and two data lines (data line). The gate line 2 provides a signal scan 1 for the APS 1 and the APS 4 in the first row, and provides a signal scan 2 for the APS 2 and the APS 5 in the second row. The gate line 3 provides a signal scan 1 for the APS 2 and the APS 5 in the second row, and provides a signal scan 2 for the APS 3 and the APS 6 in the third row. In addition, output ends of each column of APSs are connected to a same data line. For example, output ends of the APS 1, the APS 2, and the APS 3 are connected to a same data line, and output ends of the APS 4, the APS 5, and the APS 6 are connected to a same data line.

Therefore, in this embodiment of this application, when a fingerprint signal of a current row is read, compensation reset can be performed on an APS that has completed reading in a previous row, to prepare to start exposure of a next frame. In this way, a read operation and a compensation reset operation are completed in one scanning process.

An embodiment of this application further provides a fingerprint recognition system. The fingerprint recognition system includes any possible optical signal processing circuit in the embodiments of this application.

An embodiment of this application further provides an electronic device. The electronic device includes any possible optical signal processing system in the embodiments of this application, a panel, a display screen module, and a processor, and/or another module/unit. The optical signal processing system is disposed on the panel, the display screen module is configured to provide lighting for the optical signal processing circuit, and the processor is configured to process an output signal output by the optical signal processing circuit.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical signal processing circuit, comprising a photosensitive device, an amplifier transistor, a first switch transistor, a second switch transistor, a readout circuit, a control circuit, and a voltage-adjustable power supply, wherein
the photosensitive device is connected to a gate of the amplifier transistor, the first switch transistor is bridged between the gate and a drain of the amplifier transistor, a source of the amplifier transistor is connected to the voltage-adjustable power supply, the source or the drain of the amplifier transistor is connected to the readout circuit through the second switch transistor, and the control circuit is connected to the first switch transistor, the second switch transistor, and the voltage-adjustable power supply;

the control circuit is configured to control the optical signal processing circuit to be in a first state, a second state after the first state, and a third state after the second state;

when the optical signal processing circuit is in the first state, the control circuit is configured to:
control the first switch transistor to be turned on,
control the second switch transistor to be turned off, and
control the voltage-adjustable power supply to apply a compensation reset voltage to the source of the amplifier transistor so that a gate-source voltage of the amplifier transistor is equal to a threshold voltage of the amplifier transistor;

when the optical signal processing circuit is in the second state,
the photosensitive device is configured to generate an input voltage applied to the gate of the amplifier transistor; and
the control circuit is configured to:
control the first switch transistor to be turned off,
control the voltage-adjustable power supply to be disconnected from the source of the amplifier transistor, and
control the second switch transistor to be turned off; and when the optical signal processing circuit is in the third state,
the control circuit is configured to:
control the first switch transistor to be turned off, and
control the second switch transistor to be turned on to apply an output signal of the amplifier transistor to the readout circuit, and
the control circuit is further configured to control the voltage-adjustable power supply to apply a read reference voltage to the source of the amplifier transistor, so that the gate-source voltage of the amplifier transistor is a sum of the threshold voltage of the amplifier transistor, the input voltage, and a voltage increment, wherein the voltage increment is an amplitude difference between the compensation reset voltage and the read reference voltage.

2. The circuit according to claim 1, wherein the amplifier transistor is an N-type transistor, and the gate of the amplifier transistor is connected to an anode of the photosensitive device.

3. The circuit according to claim 2, wherein
the drain of the amplifier transistor is connected to the readout circuit through the second switch transistor;
the voltage-adjustable power supply comprises a third switch transistor, a fourth switch transistor, a first power supply node of the compensation reset voltage, and a second power supply node of the read reference voltage, wherein the third switch transistor is connected to the first power supply node, the fourth switch transistor is connected to the second power supply node;
in the first state, the control circuit is configured to control the third switch transistor to be turned on and the fourth switch transistor to be turned off to connect the first power supply node to the source of the amplifier transistor;
in the third state, the control circuit is configured to control the third switch transistor to be turned off and the fourth switch transistor to be turned on to connect the second power supply node to the source of the amplifier transistor; and in the second state, the control circuit is configured to control the third switch transistor to be turned off and the fourth switch transistor to be turned off to disconnect the first power supply node and the second power supply node from the source of the amplifier transistor.

4. The circuit according to claim 3, wherein
the first switch transistor, the second switch transistor, the third switch transistor, and the fourth switch transistor are all N-type transistors;
the readout circuit comprises an operational amplifier circuit, and a capacitor;
an inverting input terminal of the operational amplifier circuit is connected to the drain of the amplifier transistor through the second switch transistor;
a non-inverting input terminal of the operational amplifier circuit is connected to a node of a reference voltage; and
the capacitor is coupled between the inverting input terminal and an output terminal of the operational amplifier circuit.

5. The circuit according to claim 2, wherein the compensation reset voltage is −4.5 V, and the read reference voltage is −6 V.

6. The circuit according to claim 1, wherein the amplifier transistor is a P-type transistor, and the gate of the amplifier transistor is connected to a cathode of the photosensitive device.

7. The circuit according to claim 6, further comprising a third switch transistor through which the drain of the amplifier transistor is connected to a bias power supply node of a bias voltage, wherein
an anode of the photosensitive device is connected to the bias power supply node;
the voltage-adjustable power supply comprises a fourth switch transistor, the second switch transistor, a first power supply node of the compensation reset voltage, and a second power supply node of the read reference voltage, wherein the fourth switch transistor is connected to the first power supply node, the source of the amplifier transistor is connected to the readout circuit through the second switch transistor;
the readout circuit comprises an operational amplifier circuit, and a non-inverting input terminal of the operational amplifier circuit is connected to the second power supply node;
in the first state, the control circuit is configured to control the fourth switch transistor to be turned on and the second switch transistor to be turned off to connect the first power supply node to the source of the amplifier transistor;
in the third state, the control circuit is configured to control the fourth switch transistor to be turned off and the second switch transistor to be turned on to connect the second power supply node to the source of the amplifier transistor; and
in the second state, the control circuit is configured to control the fourth switch transistor to be turned off and the second switch transistor to be turned off to disconnect the first power supply node and the second power supply node from the source of the amplifier transistor.

8. The circuit according to claim 7, wherein
the first switch transistor, the second switch transistor, the third switch transistor, and the fourth switch transistor are all P-type transistors;
the source of the amplifier transistor is connected to the first power supply node of the compensation reset voltage through the fourth switch transistor;

in the first state, the control circuit is configured to control the first and fourth switch transistors to be turned on and the second and third switch transistors to be turned off;

in the second state, the control circuit is configured to control the first through fourth switch transistors to be turned off; and in the third state, the control circuit is configured to control the first and fourth switch transistors to be turned off and the second and third switch transistors to be turned on.

9. The circuit according to claim 7, wherein the bias voltage is −6V, the compensation reset voltage is −1 V, and the read reference voltage is −0.6 V.

10. The circuit according to claim 1, wherein the photosensitive device is a photo diode or an organic photodetector.

11. An optical signal processing system, comprising at least two rows of a plurality of optical signal processing circuits, and a control circuit, wherein each row of the at least two rows comprises at least one optical signal processing circuit among the plurality of optical signal processing circuits, and the at least two rows of the plurality of optical signal processing circuits share the control circuit;

each optical signal processing circuit among the plurality of optical signal processing circuits comprises a photosensitive device, an amplifier transistor, a first switch transistor, a second switch transistor, and a voltage-adjustable power supply, wherein the photosensitive device is connected to a gate of the amplifier transistor, the first switch transistor is bridged between the gate and a drain of the amplifier transistor, a source of the amplifier transistor is connected to the voltage-adjustable power supply, the source or the drain of the amplifier transistor is connected to a readout circuit through the second switch transistor, and the control circuit is connected to the first switch transistor, the second switch transistor, and the voltage-adjustable power supply;

the control circuit is configured to control the optical signal processing circuit to be in a first state, a second state after the first state, and a third state after the second state;

when the optical signal processing circuit is in the first state, the control circuit is configured to:
control the first switch transistor to be turned on,
control the second switch transistor to be turned off, and
control the voltage-adjustable power supply to apply a compensation reset voltage to the source of the amplifier transistor so that a gate-source voltage of the amplifier transistor is equal to a threshold voltage of the amplifier transistor;

when the optical signal processing circuit is in the second state,
the photosensitive device is configured to generate an input voltage applied to the gate of the amplifier transistor; and
the control circuit is configured to:
control the first switch transistor to be turned off,
control the voltage-adjustable power supply to be disconnected from the source of the amplifier transistor, and
control the second switch transistor to be turned off;

when the optical signal processing circuit is in the third state, the control circuit is configured to:
control the first switch transistor to be turned off, and
control the second switch transistor to be turned on to apply an output signal of the amplifier transistor to the readout circuit, and the control circuit is further configured to control the voltage-adjustable power supply to apply a read reference voltage to the source of the amplifier transistor, so that the gate-source voltage of the amplifier transistor is a sum of the threshold voltage of the amplifier transistor, the input voltage, and a voltage increment, wherein the voltage increment is an amplitude difference between the compensation reset voltage and the read reference voltage; and the control circuit is configured to input a same control signal into a first optical signal processing circuit in a first row of the at least two rows and a second optical signal processing circuit in a second row of the at least two rows, to control the first optical signal processing circuit in the first row to be in the first state and the second optical signal processing circuit in the second row to be in the third state.

12. The optical signal processing system according to claim 11, wherein the amplifier transistor is an N-type transistor, and the gate of the amplifier transistor is connected to an anode of the photosensitive device.

13. The optical signal processing system according to claim 12, wherein the drain of the amplifier transistor is connected to the readout circuit through the second switch transistor;

the voltage-adjustable power supply comprises a third switch transistor, a fourth switch transistor, a first power supply node of the compensation reset voltage, and a second power supply node of the read reference voltage, wherein the third switch transistor is connected to the first power supply node, the fourth switch transistor is connected to the second power supply node;

in the first state, the control circuit is configured to control the third switch transistor to be turned on and the fourth switch transistor to be turned off to connect the first power supply node to the source of the amplifier transistor;

in the third state, the control circuit is configured to control the third switch transistor to be turned off and the fourth switch transistor to be turned on to connect the second power supply node to the source of the amplifier transistor; and in the second state, the control circuit is configured to control the third switch transistor to be turned off and the fourth switch transistor to be turned off to disconnect the first power supply node and the second power supply node from the source of the amplifier transistor.

14. The optical signal processing system according to claim 13, wherein the first switch transistor, the second switch transistor, the third switch transistor, and the fourth switch transistor are all N-type transistors;

the readout circuit comprises an operational amplifier circuit, and a capacitor;

an inverting input terminal of the operational amplifier circuit is connected to the drain of the amplifier transistor through the second switch transistor;

a non-inverting input terminal of the operational amplifier circuit is connected to a node of a reference voltage; and the capacitor is coupled between the inverting input terminal and an output terminal of the operational amplifier circuit.

15. The optical signal processing system according to claim 12, wherein the compensation reset voltage is −4.5 V, and the read reference voltage is −6 V.

16. The optical signal processing system according to claim 11, wherein the amplifier transistor is a P-type transistor, and the gate of the amplifier transistor is connected to a cathode of the photosensitive device.

17. The optical signal processing system according to claim 16, further comprising a third switch transistor through which the drain of the amplifier transistor is connected to a bias power supply node of a bias voltage, wherein
an anode of the photosensitive device is connected to the bias power supply node;
the voltage-adjustable power supply comprises a fourth switch transistor, the second switch transistor, a first power supply node of the compensation reset voltage, and a second power supply node of the read reference voltage, wherein the fourth switch transistor is connected to the first power supply node, the source of the amplifier transistor is connected to the readout circuit through the second switch transistor;
the readout circuit comprises an operational amplifier circuit, and a non-inverting input terminal of the operational amplifier circuit is connected to the second power supply node;
in the first state, the control circuit is configured to control the fourth switch transistor to be turned on and the second switch transistor to be turned off to connect the first power supply node to the source of the amplifier transistor;
in the third state, the control circuit is configured to control the fourth switch transistor to be turned off and the second switch transistor to be turned on to connect the second power supply node to the source of the amplifier transistor; and
in the second state, the control circuit is configured to control the fourth switch transistor to be turned off and the second switch transistor to be turned off to disconnect the first power supply node and the second power supply node from the source of the amplifier transistor.

18. The optical signal processing system according to claim 17, wherein
the first switch transistor, the second switch transistor, the third switch transistor, and the fourth switch transistor are all P-type transistors;
the readout circuit further comprises a capacitor coupled between an inverting input terminal of the operational amplifier circuit and an output terminal of the operational amplifier circuit;
the inverting input terminal of the operational amplifier circuit is connected to the source of the amplifier transistor through the second switch transistor;
the source of the amplifier transistor is connected to the first power supply node of the compensation reset voltage through the fourth switch transistor;
in the first state, the control circuit is configured to control the first and fourth switch transistors to be turned on and the second and third switch transistors to be turned off;
in the second state, the control circuit is configured to control the first through fourth switch transistors to be turned off; and
in the third state, the control circuit is configured to control the first and fourth switch transistors to be turned off and the second and third switch transistors to be turned on.

19. The optical signal processing system according to claim 16, wherein the compensation reset voltage is −1 V, and the read reference voltage is −0.6 V.

20. An electronic device, comprising an optical signal processing system, a panel, a display screen module, and a processor, wherein
the optical signal processing system is disposed on the panel, the display screen module is configured to provide lighting for the optical signal processing system, and the processor is configured to process data output by the optical signal processing system;
the optical signal processing system comprises at least two rows of a plurality of optical signal processing circuits, and a control circuit,
each row of the at least two rows comprises at least one optical signal processing circuit among the plurality of optical signal processing circuits, and the at least two rows of the plurality of optical signal processing circuits share the control circuit;
each optical signal processing circuit among the plurality of optical signal processing circuits comprises a photosensitive device, an amplifier transistor, a first switch transistor, a second switch transistor, and a voltage-adjustable power supply, wherein
the photosensitive device is connected to a gate of the amplifier transistor, the first switch transistor is bridged between the gate and a drain of the amplifier transistor, a source of the amplifier transistor is connected to the voltage-adjustable power supply, the source or the drain of the amplifier transistor is connected to a readout circuit through the second switch transistor, and the control circuit is connected to the first switch transistor, the second switch transistor, and the voltage-adjustable power supply;
the control circuit is configured to control the optical signal processing circuit to be in a first state, a second state after the first state, and a third state after the second state;
when the optical signal processing circuit is in the first state, the control circuit is configured to:
control the first switch transistor to be turned on,
control the second switch transistor to be turned off, and
control the voltage-adjustable power supply to apply a compensation reset voltage to the source of the amplifier transistor so that a gate-source voltage of the amplifier transistor is equal to a threshold voltage of the amplifier transistor;
when the optical signal processing circuit is in the second state,
the photosensitive device is configured to generate an input voltage applied to the gate of the amplifier transistor; and
the control circuit is configured to:
control the first switch transistor to be turned off, control the voltage-adjustable power supply to be disconnected from the source of the amplifier transistor, and control the second switch transistor to be turned off;
when the optical signal processing circuit is in the third state, the control circuit is configured to:
control the first switch transistor to be turned off, and control the second switch transistor to be turned on to apply an output signal of the amplifier transistor to the readout circuit, and
the control circuit is further configured to control the voltage-adjustable power supply to apply a read reference voltage to the source of the amplifier transistor, so that the gate-source voltage of the amplifier transistor is a sum of the threshold voltage of the amplifier transistor, the input voltage, and a voltage increment, wherein the voltage increment is an amplitude difference between the compensation reset voltage and the read reference voltage; and the control circuit is configured to input a same control signal into a first optical signal processing circuit in a first row of the at least two rows and a second optical signal processing circuit in a second row of the at least two rows, to control the first optical signal processing circuit in the first row to be in the first state and the second optical signal processing circuit in the second row to be in the third state.

* * * * *

UNITED STATES PATENT AND TRADEMARK OFFICE
CERTIFICATE OF CORRECTION

PATENT NO. : 11,749,013 B2
APPLICATION NO. : 17/182540
DATED : September 5, 2023
INVENTOR(S) : Xilin Wang et al.

It is certified that error appears in the above-identified patent and that said Letters Patent is hereby corrected as shown below:

On the Title Page

Item (57) The Abstract should be replaced with the paragraph below:
An optical signal processing circuit includes a photosensitive device, an amplifier transistor, a first switch transistor, a second switch transistor, a readout circuit, a control circuit, and a voltage-adjustable power supply. In a first state, a compensation reset voltage is applied to a source of the amplifier transistor, and a gate-source voltage of the amplifier transistor is equal to a threshold voltage of the amplifier transistor. In a second state after the first state, an input signal is applied to a gate of the amplifier transistor. In a third state after the second state, a read reference voltage is applied to the source of the amplifier transistor, and the gate-source voltage of the amplifier transistor is a sum of the threshold voltage, the input voltage, and a voltage increment being an amplitude difference between the compensation reset voltage and the read reference voltage.

Signed and Sealed this
Tenth Day of October, 2023

Katherine Kelly Vidal
*Director of the United States Patent and Trademark Office*